United States Patent [19]

Sordello et al.

[11] 4,188,646
[45] Feb. 12, 1980

[54] SECTORIZED DATA PATH FOLLOWING SERVO SYSTEM

[75] Inventors: Frank J. Sordello, Los Gatos; Edward R. Darrah, San Jose, both of Calif.; James J. Touchton, Boulder, Colo.

[73] Assignee: Sperry Rand Corporation, New York, N.Y.

[21] Appl. No.: 910,257

[22] Filed: May 30, 1978

[51] Int. Cl.² .............................................. G11B 21/10
[52] U.S. Cl. ......................................... 360/77; 360/48
[58] Field of Search ........................ 360/77, 78, 48, 51

[56] References Cited

U.S. PATENT DOCUMENTS

| | | | |
|---|---|---|---|
| 3,691,543 | 9/1972 | Mueller | 360/78 |
| 3,787,815 | 1/1974 | Farr | 360/48 |
| 3,801,969 | 4/1974 | Sordello | 360/48 |
| 3,810,234 | 5/1974 | Monett | 360/51 |
| 3,864,740 | 2/1975 | Sordello | 360/77 |
| 3,864,741 | 2/1975 | Schwarz | 360/77 |
| 4,027,338 | 5/1977 | Kril | 360/77 |
| 4,032,984 | 6/1977 | Kaser et al. | 360/77 |
| 4,048,660 | 9/1977 | Dennison | 360/77 |
| 4,087,843 | 5/1978 | Louis | 360/77 |

Primary Examiner—John H. Wolff
Attorney, Agent, or Firm—Eugene T. Battjer; Thomas Schneck, Jr.; William E. Cleaver

[57] ABSTRACT

A servo system for accurately positioning a transducer relative to data paths on a recording medium by detecting sync and servo signals from two parallel abutting servo tracks sharing a common longitudinal boundary within circumferentially spaced sectors of the medium. Within each sector of the recording medium, two servo waveforms of different frequencies in two abutting servo tracks are preceded by a sync reference waveform of the same frequency in both servo tracks which is used as a reference for a phase locked oscillator, connected to the transducer, generating a pair of modulation signals that are to be mixed with transducer signals from both servo waveforms. A pair of servo channels are provided for receiving the pair of modulation signals and the servo signals for deriving an imbalance error signal representing deviation of the transducer from the center line of a data path, which is the projection from the sectors of the common longitudinal boundary between servo tracks. The imbalance error signal is used to center the transducer on the data path.

22 Claims, 7 Drawing Figures

SECTORIZED DATA PATH FOLLOWING SERVO SYSTEM

BACKGROUND OF THE INVENTION

1. Field of the Invention.

The invention relates to servo systems, and more particularly to a servo system which compensates for lateral deviations of a transducer from a data path in a recording medium.

2. Prior Art.

In data recording media, it is customary to record data in formats wherein waveforms representing data are disposed in parallel paths. To reproduce the data, a transducer is used to convert the recorded waveforms into electrical signals. The transducer must accurately follow the center of the data paths in order to obtain the best reproduction of the recorded waveforms. Previously, servo systems have been used to maintain the transducer in a proper path following position, near the path center line as measured from side to side. A common prior art servo system relies on recording of servo waveforms in tracks on a separate servo medium which is maintained parallel to other media, usually in a stacked relationship having user data recorded in paths which correspond to the servo tracks. Typically the paths overlie one another, forming a cylinder. A transducer accurately positioned over a servo track is ganged with transducers over the data paths for very fine alignment of the latter. The paths and tracks are equivalent, but tracks refer to positions for servo data, while paths refer to position for user data.

It has been previously recognized that there are a number of advantages in combining servo waveforms and user data waveforms on the same medium. This is especially important in small systems. For example, if only one user data medium is required, a separate servo medium parallel to the user medium would mean that one half of the total media space is dedicated to servo waveforms, an unacceptably high level. On the other hand, if servo and user data could be combined, a separate servo medium would not be needed.

Momentarily disregarding the problem of where to put servo waveforms, most formats for representing servo data used in fine positioning of a transducer over a data path can be classified as: (1) phase discriminating, (2) limited pulse types and (3) dual frequency. In the first case, two servo waveforms having a known phase relationship are recorded on adjacent servo tracks and are simultaneously read and compared to control transducer position. For example, see U.S. Patent 3,427,606 to Black and Sordello. In the second case, positive and negative pulses are recorded on adjacent servo tracks with periodic polarity reversals. Polarity reversals in two adjacent tracks are sensed by a transducer and amplitudes are compared for centering the transducer. For example, see U.S. Pat. No. 3,534,344 to Santana and U.S. Pat. No. 3,691,543 to Mueller. In the third case, two waveforms representing two different frequencies are recorded on adjacent servo tracks with a servo signal being derived by separation of the frequencies and comparison of the amplitudes of the two signals. For example, see U.S. Pat. No.3,864,740 to Sordello and Cuda.

One of the problems with the first format is that unwanted phase shifts due to speed variations of the media or recording arm head sway or anomalies in the electronics for reading or writing data can cause phase errors, creating uncertainties in the servo information. In the second format, media defects, such as small holes or anomalies in the media or particles of the media surfaces can block detection of pulses, also creating errors. For these reasons and others the third format has been adopted herein.

Returning now to the problem of where to place the servo information, U.S. Pat. No. 3,864,741 to Schwartz, using a modification of the third format, the dual frequency approach, teaches that circumferentially spaced sectors interrupting user data paths allow servo information to be placed on the same medium with user data without requiring the expense of making two different media layers on the same disk, one for user data and one for servo data. However, the aforementioned patent uses two frequencies which must be widely spaced for unambiguous detection and equalization of the amplitudes of the two signals.

The aforementioned U.S. Pat. No. 3,864,740 to Sordello and Cuda teaches the advantage of using two closely spaced servo frequencies, as opposed to the previously mentioned widely spaced frequencies, for correcting transducer position. In review, certain advantages accrue in the use of such closely spaced servo frequencies because (1) the recording characteristics of the transducer change with frequency and therefore the magnitude of the signal from the recorded tracks varies with frequency; (2) the flying height of the transducer varies and as a result the two signals are attenuated at rates varying with frequency; (3) the readback characteristics of the read/write head are different for the two frequencies; (4) the magnetic characteristics of the recording medium change with frequency; (5) the electronic characteristics of the circuit may change with frequency; and (6) changes in the relative speed between the recording medium and the transducer can alter the frequency of the readout signal sufficiently to detune the electronic filters which are frequency dependent.

Sordello and Cuda relied upon a modulation technique to reduce their two closely spaced servo frequencies to two low frequencies suitable for controlling an actuator. The prior art Sordello and Cuda modulation technique used a phase locked oscillator to generate modulating signals to be combined with the closely spaced servo frequencies. However, a new problem now arises.

The phase locked oscillator requires a synchronizing reference frequency. Of course, such a synchronizing reference can be provided by a separate source such as a clock track or even by a separate glass disk or timing gear rotating with the medium and having marks which initiate timing pulses at a desired rate. However, these sync reference frequency sources introduce additional tolerances, components and space requirements which are to be avoided where only a single or a few stacked recording media are to be used.

SUMMARY OF THE INVENTION

An object of the invention is to devise a servo system having a modulated, two frequency, narrow band, position correcting signal for fine tracking of a transducer over a user data path in a recording medium wherein servo signals are derived from such medium containing the user data.

A further object of the invention is to use a phase-locked oscillator for generating modulation frequencies in such a system while having synchronizing reference signal for the oscillator derived from the same medium from which the servo signals are derived.

Still another object is to derive all frequencies in such a servo system, including data writing frequencies, from a single phase-locked oscillator.

The above objects have been attained in a servo system wherein data path recording areas of a recording medium are interrupted by a plurality of spaced servo sectors containing regions with sync and servo waveforms. Each sector has parallel tracks called servo tracks for recording sync and servo waveforms in each track wherein a common longitudinal boundary of two parallel adjacent servo tracks is a projection of the center line of a data path. Since servo tracks are recorded on a recording medium before data paths are established the common boundary between servo tracks defines the center line of a data path and thereby establishes the path. Thus, a transducer directly over the boundary will be in the center of the data path after traversing a sector.

The transducer, which converts disk waveforms into electrical signals, is connected to a phase-locked oscillator. The oscillator provides multiple output frequencies for the servo system, including modulation frequencies for mixing with signals derived from two abutting servo tracks, the resultant combinations of which are two frequencies within a narrow bandwidth to be used to correct transducer position to be exactly over the center line of a data track.

A sync reference frequency for the phase-locked oscillator is picked up from the sync reference waveforms in the servo tracks. The sync reference and servo waveforms in each sector are divided into two regions with sync reference waveforms all of a single frequency recorded in two abutting servo tracks in one region of the sector preceding and in linear alignment with servo waveforms in another region of the sector. A transducer traversing a sector will first encounter sync reference waveforms followed by servo waveforms. If the phase-locked oscillator has drifted in frequency or phase, circuits are provided for making a correction. The corrected oscillator frequency is divided down yielding two modulation frequencies for mixing with two servo frequencies from the two recorded servo waveforms. Mixing occurs in a pair of servo channels wherein sum and difference resultant frequencies are separated by rectification and filter circuits and then combined to produce an amplitude imbalance error signal representing deviation of the transducer from the center line of a data path. The imbalance error signal is fed to an actuator for centering the transducer on a data path.

The phase-locked oscillator is used as a source, not only of the modulation signals, but also of the data write clocking frequency. Electrical circuits are provided for the gating of the oscillator signals to the modulators only after the phase-locked oscillator frequency is set by the sync waveform, while the previously mentioned filter circuits in the two servo channels provide narrow bandwidth output for derivation of the imbalance signal. Thus, both time and frequency domain discrimination enhance the system signal to noise ratio, where system noise would include noise derived from servo channels.

One of the chief advantages of the present invention is that a two frequency, narrow bandwith servo system can be implemented with sector contained servo tracks at a small cost in terms of the data surface of a typical recording medium. This is particularly useful in single or dual disk recording systems, as well as in larger systems.

Another advantage is that multiple frequencies used in the above mentioned servo system can be produced in a single phase-locked oscillator whose reference frequency is based on sync reference waveforms contained in the servo sector.

DESCRIPTION OF THE PREFERRED EMBODIMENT

Figure 1:
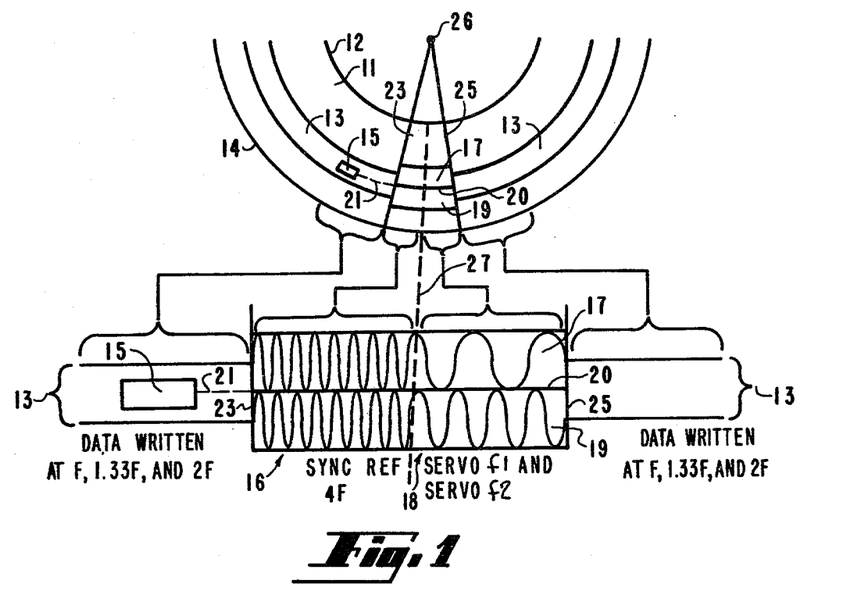
FIG. 1 is a plan view of a data recording medium showing a servo sector interrupting a user data storage area, together with waveforms of data and sector areas.

With reference to FIG. 1, a recording medium 11 is shown. The servo system of the present invention is particularly useful for magnetic disk recording media, but nothing herein restricts the servo system of the present invention to magnetic media or to circular disks. The invention is applicable in general to linear data path arrays, whether circular or straight. However, for purposes of this discription concentric, circular data paths will be described.

One aspect of the present invention involves an improvement in data paths achieved by providing servo sectors for a recording medium which will keep a transducer over the center of a data path. Another aspect involves electronics which use the sectors and information therein to perform operations which achieve the desired result.

In order to understand the reason for providing the servo sectors of the present invention, and the construction thereof, it is necessary to understand the appearance of a recording medium having user data thereon between sectors.

Recording medium 11, occupying the space between inner and outer guard band edges 12 and 14, respectively, has a recording area for plurality of parallel concentric circular data paths which are closely spaced. The paths have a radius originating at the axis of disk rotation 26. It is common to position hundreds of parallel data paths for user data on a disk at spacings of a few thousandths of an inch, with the path width being approximately equal to the spacing between paths. The path width is its lateral or radial dimension while the orthogonal dimension or direction is termed the longitudinal dimension or direction. The same terms apply to the servo tracks.

Recording medium 11 is shown in plan form to have a data path 13 whose dimensions are greatly magnified for purposes of illustration. A transducer 15 is shown to be positioned in the center of data path 13. The lateral position of transducer 15 is adjusted by means of an actuator, not shown, which provides coarse adjustment for accessing a specified data path as well as fine adjustment within a data path so that the transducer 15 may be positioned in the center of the data path 13. The present invention deals with fine lateral positioning of a transducer over a data path.

Data path 13, like other data paths parallel to it, is interrupted by a plurality of servo sectors, only one of which is shown in FIG. 1, defined between radial lines 23,25. Within this sector are parallel, servo tracks, such as the odd servo track 17 and the even servo track 19, both of said servo tracks having circumferential edges which are arcs of circles having a common center 26. These servo tracks are of equal lateral dimension and abut in a common longitudinal boundary 20. Since servo tracks in all servo sectors are established by recording waveforms on the medium prior to recording user data in data paths, the projection 21 of common longitudinal boundary 20 outside of the servo sector, in both directions, defines the center of a data path 13. By exact positioning of transducer 15 over the boundary 20, the transducer will automatically be over the center of data path 13.

For purposes of defining data path center lines (DP), one pair of odd and even (O and E) servo tracks are required. For example, DP1 is defined by the boundary of O1, E1; DP2 is defined by the boundary of E1, O2; DP3 is defined by the boundary of O2, E2. It will be realized that n+1 laterally abutting servo tracks define n data path centers. Each of the servo tracks within a sector has two regions divided by dashed line 27. A first region of each servo track, to the left of dashed line 27 is known as the header portion 16 and contains a waveform reproduced in two laterally abutting tracks known as the sync reference. The sync reference waveform recorded in abutting odd and even servo tracks is identical in amplitude, phase and frequency. To the right of dashed line 27 is the tail region 18 of each servo track. The tail region of the odd and even servo tracks contain recorded servo waveforms recorded at a frequency f1 in the odd servo track and at a frequency of f2 in the even servo track. The tail region 18 of each servo track terminates at radial line 25 whereupon the data path 13 continues in longitudinal geometric alignment with the previously interrupted portion of the same data path. Similarly, the header region of an odd or even servo track in one servo sector will be in longitudinal geometric alignment with the tail region of an odd or even servo track in a preceding servo sector. Header regions of servo tracks of different radii are circumferentially aligned, i.e. are defined between the same radial lines, and so are the tail regions. This is referred to as regional alignment of header and tail regions, i.e. the longitudinal boundaries of sectors subtend an equal angle with respect to the center of rotation of a disk.

In the lower portion of FIG. 1, the data path 13 and the servo tracks 17, 19 have been enlarged to show the waveforms which exist in the odd and even servo tracks. The term "waveforms" refers to oscillations recorded on a recording medium, such as a disk, while the term "frequency" refers to a number of oscillations per second present in an electrical signal which may be recorded as a waveform or derived therefrom, or used in the operation of circuits. To the left of radial 23, data has been written on data path 13 at data recording frequencies F, 1.33F, and 2F. After passing radial line 23, the header region 16 of the odd 17 and even 19 servo tracks can be seen to contain a sinusoidal waveform which is to become the sync or reference frequency.

This frequency is recorded at frequency 4F and extends completely across the longitudinal dimension of header region 16. The two sync reference waveforms in each servo tract are in phase so that upon pickup by a transducer the waveforms will be mutually reinforced, yielding the same reference signal independent of radial transducer position.

Upon crossing dashed line 27 which separates the header region 16 from the tail region 18, the odd servo track 17 has a first servo waveform thereon written at a frequency f1, while the even servo track 19 has a second servo frequency f2 written thereon. Both of the waveforms f1 and f2 extend completely across the longitudinal dimension of tail region 18 of each servo sector from the dashed line 27 to radial line 25. To the right of radial line 25 the data path 13 again continues in geometric alignment with the previously interrupted data path 13. The servo waveforms f1 and f2 are sinusoidal continuations of the sync waveform, but at different frequencies. The frequencies of f1 and f2 are selected so that they are closely spaced, i.e. the difference between them is relatively low, but are easy to separate by the techniques described in U.S. Pat. No. 3,864,740. By closely spacing the frequencies, both magnetic recording and electronic frequency dependent errors are greatly reduced. Furthermore, the frequencies may be in the data read channel where data is not separated from servo signals near the front end of the system. For example, a frequency of 2.42 MHz has been used for f1 and 2.58 MHz has been used for f2.

Less than sixty-four periods of the sync reference frequency are needed, although this number is not critical. In a disk system thirty-two servo sections, circumferentially spaced at equal distances, each containing sync and servo regions, as described, are preferred. Note that 1F, 1.33F, and 2F are the data code recording frequencies for digital recording. The servo frequency duration is approximately 50 microseconds so that the time for a transducer to traverse a sector is approximately 60 microseconds. These times are exemplary and one skilled in the art could readily select other appropriate times.

While only one odd and one abutting even servo tracks have been shown in FIG. 1, similar odd and even servo tracks have circumferential boundaries forming arcs in regional alignment extending from the inner guard band edge 12 of the disk all the way to the outer guard band edge 14, in each case odd and even servo tracks abutting so that boundary therebetween extended outwardly from a sector defines the center line of a data path. Each data path is interrupted by abutting odd and even servo tracks in servo sectors for fine adjustment of a transducer over the data path. Each pair of odd and even servo tracks bears the same waveforms as the odd and even servo tracks 17, 19.

Both the sync reference waveforms and the servo waveforms are recorded in the servo tracks in the servo sectors before any data is recorded on data paths. In other words, each of the sectors on a disk is formed or "formatted" prior to the time that data is to be recorded. The circumferential boundaries of servo tracks form concentric arcs interrupted by the radial line which defines each sector and forms boundaries for the area wherein user data is to be recorded. User data paths are subsequently defined on the disk such that the center line of each user data path corresponds to the projection of a common boundary between abutting odd and even servo tracks. Each user data path extends from a radial line which defines a boundary of one sector to a radial line which defines a boundary of an adjacent sector.

Figure 2:
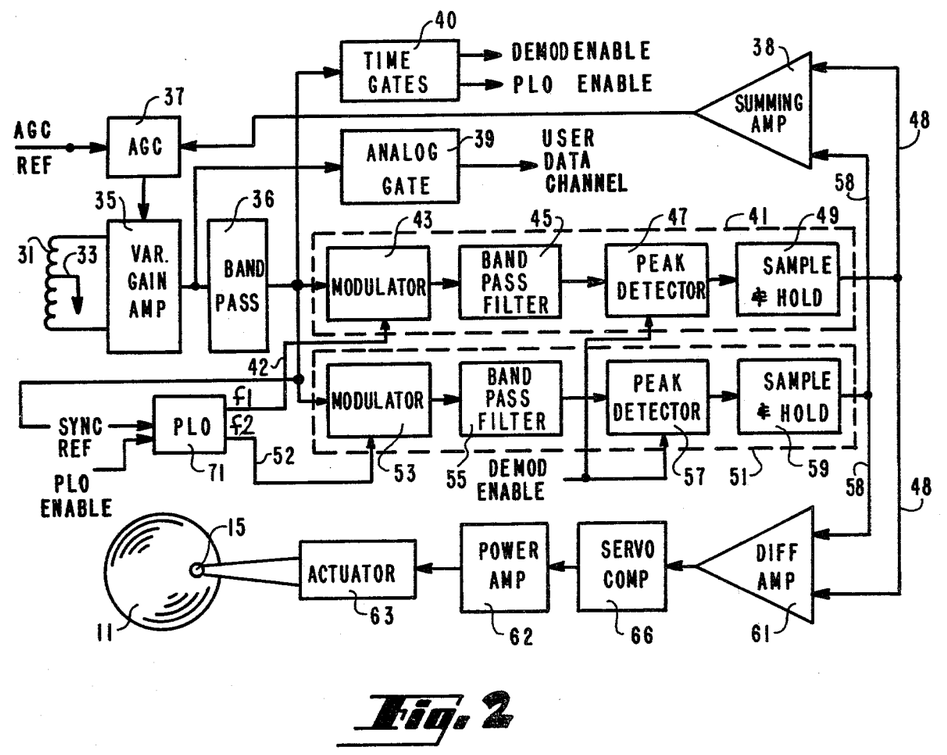
FIG. 2 is an electrical plan of the present invention.

FIG. 2 illustrates in block form the electronics for using information in the servo sectors. With reference to FIG. 2, a coil 31 is shown which is part of transducer 15 of FIG. 1. The coil 31 may have a grounded center tap 33 and serves to convert waveforms on the recording medium into electrical signals. Coil 31 is connected to a variable gain amplifier with gain controlled by an AGC circuit 37 and the output of summing amplifier 38. The AGC circuit tends to maintain the envelope of the output signal from variable gain amplifier 35 at a constant level, compensating for signal variations or low and high signal levels from various causes. The AGC circuit is supplied with a reference voltage from an external fixed supply, such as a battery or other d.c. source. The AGC circuit is selected to have a wideband characteristic for attenuation, but a narrow band characteristic for amplification. The AGC gain is initially maximum, but lowers its gain as corrective feedback from the servo channel signals 48, and 58, combined in summing amplifier 38, an operational amplifier and the AGC reference act on the initial output.

The output of variable gain amplifier 35, which may alternatively be a wide band amplifier, includes user data signals and signals from the servo tracks. Analog gate 39 passes user data signals to a data signal channel for further read processing. It is not necessary to have a user data channel separate from servo channels, but at some point, user data signals are removed from the servo information. One place to conveniently remove user data is immediately after the variable gain amplifier 35. The signals from the servo tracks are transmitted through a band pass filter 36 to a pair of servo channels indicated by the dashed lines 41, 51. Band pass filter 36 has its center frequency at approximately 2.5 MHz with 12 decibel or more rolloff per octive on both sides of the center frequency. Band pass filter 36 is needed to eliminate any harmonic content of the servo signals at the output of variable gain amplifier 35. Servo channel 41 includes a modulator 43 which may be a balanced modulator, followed by a second band pass filter 45. Band pass filter 45 is tuned to have the center of its pass band at a frequency which is the difference of the recorded servo waveform frequencies f1 minus f2. Filter 45 is connected to a demodulating peak detector 47 which converts the maximum amplitude of the signal received therein into a voltage signal representative of head position which is applied to the sample and hold circuit 49 which retains the servo positional information between servo sector times.

Similarly, in servo channel 51, the modulator 53 receives signals from the servo tracks from bandpass amplifier 36. Modulator 53 is connected to a band pass filter 55 tuned to have the center of its pass band at a frequency which is the difference of the recorded servo waveform frequencies f2 minus f1. Band pass filter 55 is connected to demodulator peak detector 57 which converts input signals into corresponding voltage signals representative of head position which are then transmitted to the sample and hold circuit 59 which functions the same as sample and hold circuit 49. The analog outputs of servo channels 41, 51 are head positional signals which are taken along lines 48, 58 and transmitted to a difference amplifier 61. The output of difference amplifier 61 represents an imbalance error signal derived by comparing the two head positional signals in difference amplifier 61, an operational amplifier. The generation of the imbalance error signal has previously been explained in U.S. Pat. No. 3,864,740 to Sordello and Cuda but will be briefly reviewed herein.

Each of the servo channels 41, 51 contains a corresponding modulator 43, 53. To each of the modulators is applied a modulation signal. For example, modulation signal frequency f1 is applied on line 42 from a phase-locked oscillator 71. Modulation frequency f1 modulates the input to modulator 43 producing sum and difference frequencies. Since modulation frequency f1 is selected to be equal to the frequency of servo signal f1 the frequency terms which appear out of the modulator are 2f1, (f1−f2), (f1+f2) and (f1−f1). Filter 45 removes all but the (f1−f2) term. Servo channel 41 processes positional information carried by recorded servo signal f2.

Similarly, in servo channel 51, the phase-locked oscillator applies a modulation frequency f2 along line 52 to modulator 53. Modulation frequency f2 is selected to be equal to the frequency of servo signal f2. The output of modulator 53 contains the signals 2f2, (f2−f1), (f2+f1) and (f2−f2) which may deviate slightly from ideal values because of variations in RPM of disk or from tolerances in the recording or readback process. However, the actual frequencies should approximate the ideal with a deviation approximately equal to two percent. Similarly (f1−f1) or (f2−f2) should be zero frequency, but in practice may be a slowly varying DC or a low frequency signal. Servo channel 51 processes positional information carried by recorded servo signal f1.

The two remaining signals, (f1−f2) in channel 41 and (f2−f1) in channel 51 contain signals which after demodulation by peak detection, are balanced against each other in the difference amplifier 61, as previously described. Any remaining error out of difference amplifier 61 represents a positive or negative signal which after being combined with positional information in servo compensator 66 is fed to a power amplifier 62 which has sufficient output power to drive actuator 63 which has a voice coil for adjusting the position of transducer 15, suspended a slight distance above recording medium 11.

The phase-locked oscillator which generates modulation signals f1 and f2 does so in response to a sync reference signal which is derived from the header region 16 of each servo track. The sync reference signal is a reference for the phase-locked oscillator which controls electronically generated modulation frequencies f1 and f2. This may be more clearly understood with reference to FIG. 3 which illustrates the phase-locked oscillator in block form.

Figure 3:
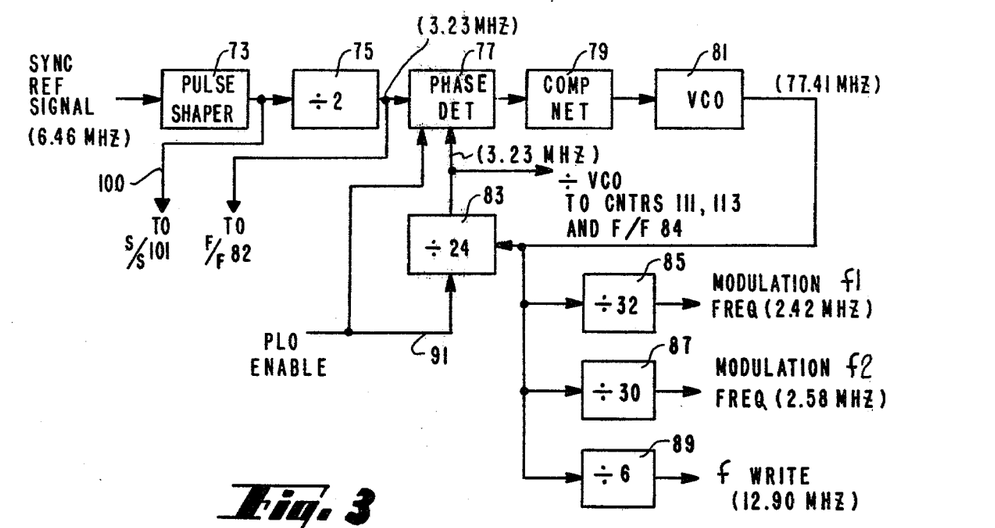
FIG. 3 is a schematic of a phase-locked loop shown in the electrical plan of FIG. 2.

In FIG. 3, the sync reference signal, at a frequency of 4F or 6.46 MHz, is applied to a pulse shaper 73 which squares the input signals at a given amplitude for treatment of the sync reference signal by digital circuits. A frequency divider 75, which is a flip-flop scaler, divides the pulse frequency in half for convenience. This signal is then transmitted to a phase detector 77 which compares the phase of the pulses received from frequency divider 75 with the phase of pulses received from voltage controlled oscillator 81 through the frequency divider 83. The phase detector compares leading edges of input pulses. When phase differences occur, a corrective signal is transmitted to compensating network 79 which translates the phase-locked oscillator corrective signals from phase detector 77 into voltages which are applied to the voltage controlled oscillator (VCO) 81 thereby controlling its frequency. Under zero phase-locked oscillator corrective conditions the two input signals to the phase detector 77 are of the same phase and of the same frequency.

VCO 81 is tuned to a given frequency 77.41 MHz, which is an integer multiple of the modulation frequencies and also the data write clocking frequency. VCO 81 produces square waves which, as previously mentioned, are divided by frequency divider 83 for transmission to the phase detector 77. The output from VCO 81 is also transmitted to frequency dividers 85, 87 and 89. A first frequency divider 85 divides the VCO output by an integer. The second frequency divider 87 divides the VCO frequency by a different integer, while the third frequency divider 89 divides the VCO output by a third integer. For example, in this embodiment a VCO frequency of 77.41 MHz may be used to derive a first modulation frequency f1 of 2.42 MHz by dividing by 32 while a second modulation frequency f2 of 2.58 MHz may be derived by dividing by 30. A data write clocking frequency, $f_{write}$ of 12.9 MHz may be derived by dividing by 6. The derived modulation frequencies are corrected when an enabling signal is transmitted along the PLO enable line 91. The enable signal occurs a time after a sync reference waveform has been received by the transducer.

Phase detector 77, compensation network 79, VCO 81 and frequency divider 83 form a phase-locked loop, or phase-locked oscillator, the heart of which is VCO 81, which together with the first and second frequency dividers 85 and 87 form an oscillator means for generating the two modulation signals in response to the sync reference signal.

Figure 4:
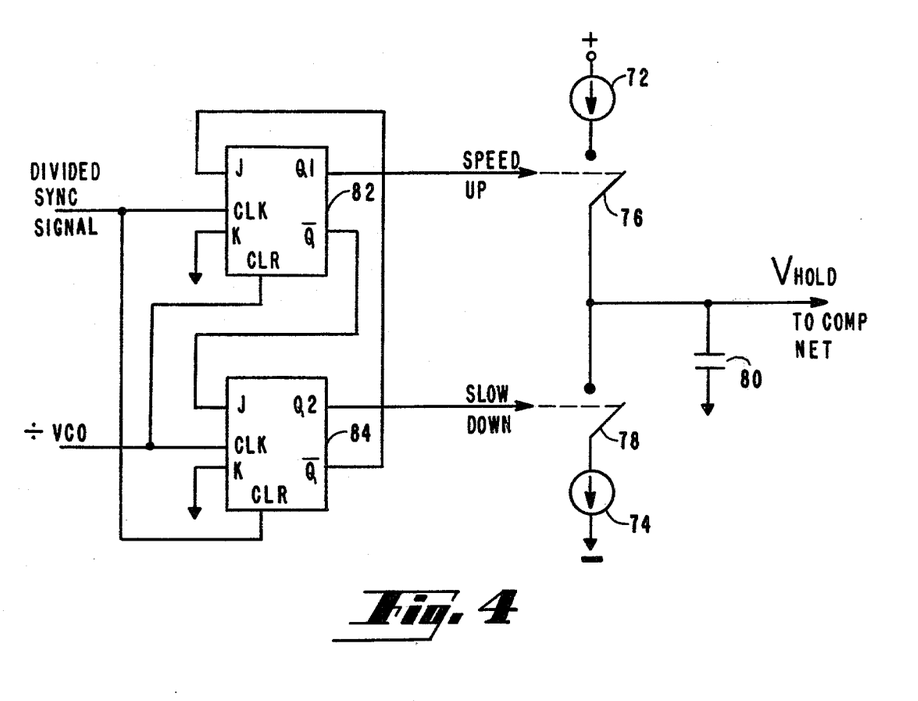
FIG. 4 is a schematic of a phase detector used in the phase-locked loop of FIG. 3.

FIG. 4 schematically shows the details of phase detector 77 of FIG. 3. The circuit includes a pair of identical J-K flip-flops 82, 84. Flip-flop 82 has a clock terminal connected to receive the sync reference signal, which has been shaped by pulse shaper 73 and divided by two by frequency divider 75 in FIG. 2. Flip-flop 84 has a clock terminal which is connected to receive the divided VCO output from frequency divider 83 in FIG. 3.

The $\bar{Q}$ output of flip-flop 84 is connected to the J input of flip-flop 82; the $\bar{Q}$ output of flip-flop 82 is connected to the J input of flip-flop 84. Both of the K inputs to the flip-flops are grounded. Both of the Q outputs are used to close switches 76, 78 which are solid state switches, preferably transistors, operated by signals supplied by the Q outputs. The current sourcing function of each transistor is indicated by the current sources 72, 74 connected to each switch.

Since the arrangement of flip-flops 82, 84 is such that only one of the flip-flops at a time can have a high level output, only one of the switches 76,78 can be closed at one time. This event occurs when there is a phase or frequency difference between the divided VCO and the divided sync reference signal. When such a phase or frequency difference occurs, the Q1 output of flip-flop 82 will produce a pulse whose duration is proportional to the phase difference if the divided VCO signal is lagging the divided sync reference signal. This is known as a "speed-up signal", which is used to close switch 76. When switch 76 is closed, the charge on capacitor 80 increases thereby increasing the holding voltage which is fed to compensation network 79.

On the other hand, when the phase of the divided VCO signal lags the divided sync reference signal, the Q2 output of flip-flop 84 produces a pulse which is proportional to the phase difference and this pulse is used to close switch 78, drawing a charge from capicitor 80 until the switch is again opened at the end of the Q2 output pulse.

The capacitor 80, in combination with the switches 76, 78 form a sample and hold circuit for adjusting the holding voltage which controls the frequency of VCO 81 in FIG. 2. The capacitor 80 helps the VCO maintain the desired frequency. However, a slight amount of leakage from the capacitor and associated circuitry may cause this holding voltage to change slightly between sectors. Furthermore, slight variations in the magnetic or electronic assemblies associated with the recording or playback systems used in connection with the data medium may also cause slight variations in the holding voltage. For that reason the holding voltage may have to be corrected at each servo sector.

In a sampled data system wherein sync reference waveforms are interlaced in sectors between data waveforms, the sample and hold circuit of the present invention provides a means for intermittent adjustment of the reference voltage for a voltage controlled oscillator of a phase locked loop.

Figure 5:
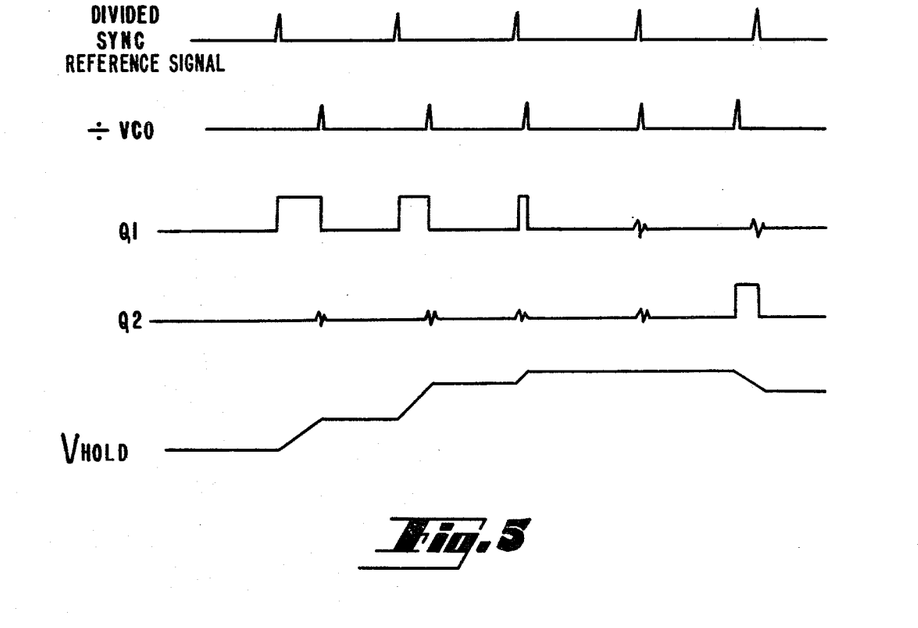
FIG. 5 shows timing waveforms for the phase detector of FIG. 4.

FIG. 5 illustrates the manner in which the signals discussed with reference to FIG. 4 operate to correct the holding voltage for the voltage controlled oscillator. The top two signals in FIG. 5 illustrate the sync reference signal in comparison to a divided VCO signal. At first, the divided VCO signal is shown to be lagging the divided sync reference signal, then is shown to be even with it and lastly is shown to be leading it. In response thereto, the Q1 output of flip-flop 82 initially produces a pulse which is proportional to the phase difference between the sync reference signal and the divided VCO signal.

As the phase difference diminishes and becomes zero, the duration of the pulses Q1 becomes shorter until the two signals divided sync reference and divided VCO occur at the same time whereupon the Q1 pulse vanishes and remains absent as the divided VCO phase leads the sync reference signal. However, the Q2 output of flip-flop 84, while initially absent when the divided VCO signal was behind the divided sync reference signal yields a positive pulse when the divided VCO signal leads the divided sync reference signal. The Q1 and Q2 outputs are used to control the switches 76, 78 which apply charge to and remove charge from capacitor 80 in FIG. 4.

The holding voltage, $V_{HOLD}$, is corrected in the manner shown by the bottom plot in FIG. 5 wherein the holding voltage is made more positive during the positive pulses of the Q1 output and remains at the higher positive levels until made negative by the Q2 output pulse which drains charge from the capacitor 80. Once the divided sync reference signal establishes the correct holding voltage during a divided sync reference burst, capacitor 80 maintains holding voltage level until correction by the next burst. The holding voltage of capacitor 80 keeps the voltage controlled oscillator of the phase locked loop at a relatively constant frequency except for small errors which are adjusted as previously described at the next servo sector. The continuously running oscillator provides a data write clocking frequency which may be used at any time, in addition to the modulation frequencies f1 and f2 which are used in the servo channels.

Figure 6:
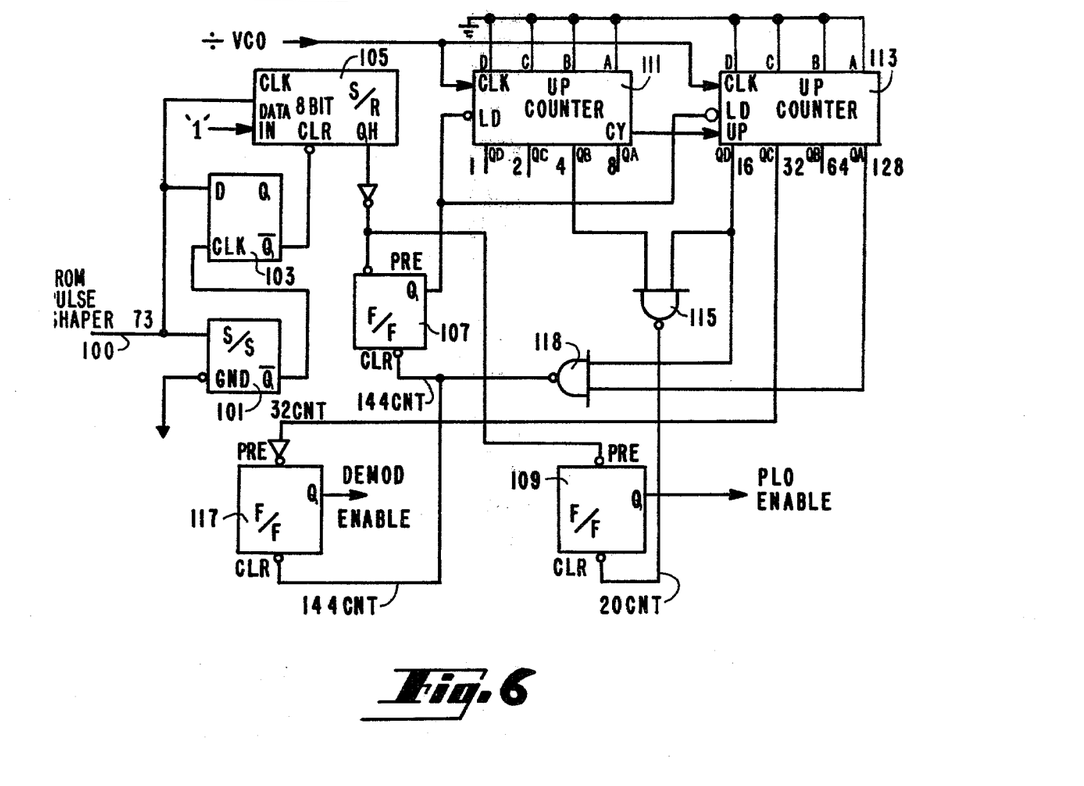
FIG. 6 is a schematic diagram of time gating circuits of the present invention.
Figure 7:
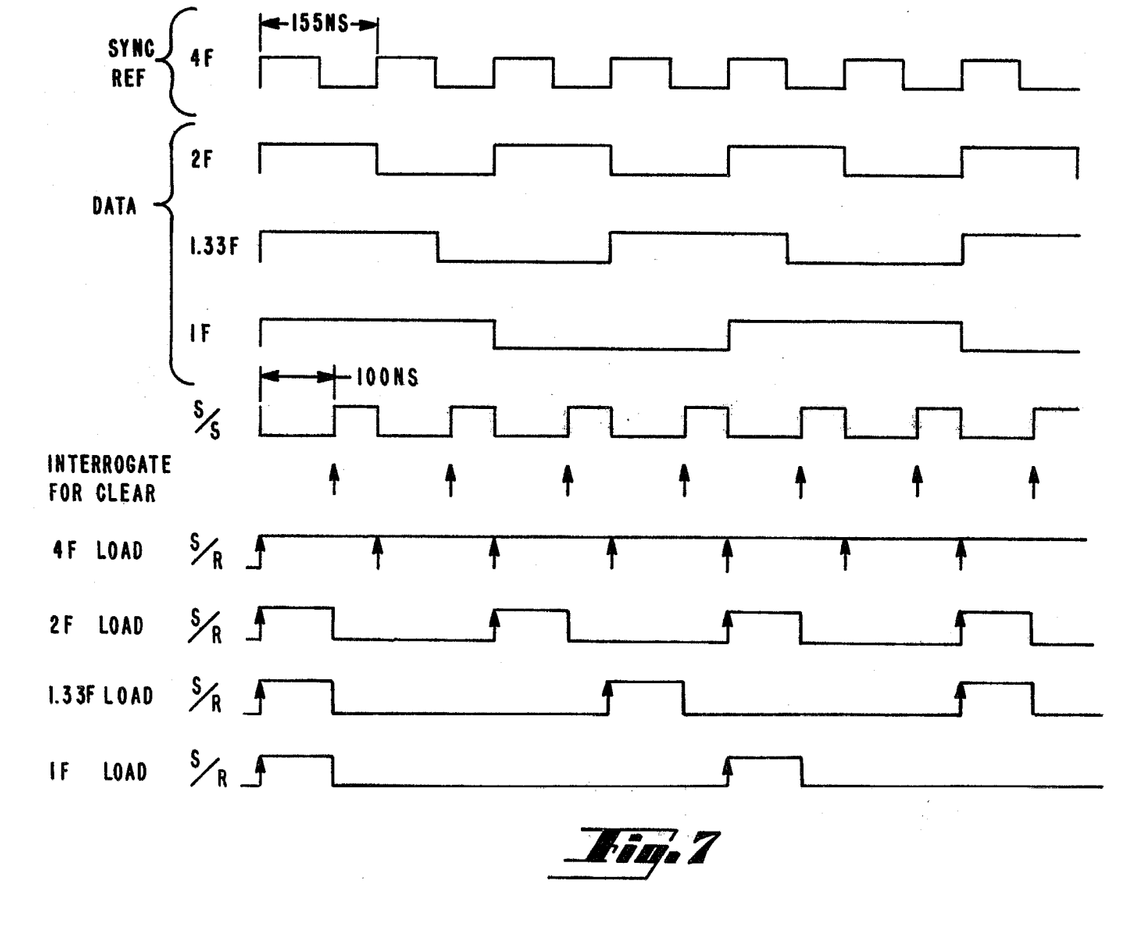
FIG. 7 shows timing waveforms for the time gating circuit of FIG. 6.

FIG. 6 is a schematic of a time gating circuit for showing the manner in which the PLO enable and demod enable signals are derived. Signals from the data transducer are fed from pulse shaper 73 along line 100 to monostable multivibrator, single-shot 101 which is interrogating for data at a rate corresponding to frequency 4F, which is the sync reference frequency. This is fast enough so that transitions of data pulses at frequencies 1F, 1.33F, and 2F will not be detected. This is shown graphically in FIG. 7 wherein the interrogating pulses of single-shot 101 are labeled S/S while the data frequencies 1F, 1.33F and 2F are shown above this. The top waveform in FIG. 7 shows square wave sync reference pulses at the frequency 4F. The interrogation by multivibrator 101 takes place on the transition from low to high as indicated by the arrows labeled "interrogate for clear."

In FIG. 6 it will be seen that the output of single-shot 101 is transmitted to D flip-flop 103 as a clock for the flip-flop. Input data is clocked through flip-flop 103 and is used to clear shift register 105 when the input to flip-flop 103 is high during the interrogation interval. However, this occurs only at the data frequencies 1F, 1.33F, and 2F. The sync frequency 4F is such that the D input to flip-flop 103 is low at the time of an interrogation and thus the shift register 105 is not reset.

Shift register 105 counts eight cycles of sync reference frequency 4F and then transmits a pulse to flip-flop 107 and to flip-flop 109. The eight counted cycles of the sync reference frequency thoroughly insures proper identification of the sync frequency. The output of flip-flop 109 is the PLO enable signal which resets frequency divider 83 in FIG. 3. By putting the first eight sync reference pulses through shift register 105 before generating the the PLO enable signal, the first eight sync reference pulses are effectively ignored. The advantage in doing this is that it eliminates the need to compensate for a slight bit pattern shift in the position of the first sync reference pulse which may occur in magnetic recording media due to the fact that another sync pulse does not precede the first pulse.

The PLO enable signal which is derived from the flip-flop 109 is used in FIG. 3 to reset frequency divider 83, whose output is compared to the divided sync reference signal in phase detector 77. The advantage in resetting frequency divider 83 to zero is that at PLO enable time, the phase detector 77 is unable to determine whether the sync reference pulse is leading or lagging, with respect to phase, the divided VCO pulse received from frequency divider 83. By resetting frequency divider 83 to zero with the PLO enable pulse, the phase detector 77 now has set both the sync reference signal and the divided VCO signal initially in phase so that the phase detector will not make the mistake of correcting in the wrong direction and thereby waste time in completing its generation of a true corrective voltage for the VCO. This savings of lock-on time represents a corresponding savings in area of servo information dedicated to the sync reference signal. The output of flip-flop 107 is fed to counters 111, 113, which are clocked by the divided VCO signal for counting further eight bit sequences of frequency 4F. After 20 counts of divided VCO signal, the nand gate 115 is activated thereby clearing flip-flop 109 and halting the PLO enable signal. By this time, the phase-locked oscillator has locked onto the sync reference signal, whereupon the enabling signal is no longer needed and the frequency of VCO 81 is adjusted as previously described. After 32 counts the flip-flop 117 is activated for enabling the servo channels as previously described. After 144 counts flip-flop 117 is cleared through a count summation in nand gate 118 and similarly flip-flop 107 is cleared since a sufficient amount of time is elasped for passage of the servo sector past the transducer. A positional error signal has been derived and the electronics must be reset for the next servo sector.

Flip-flop 109 and shift register 105 may be regarded as a first time gating circuit which enables the phase-locked oscillator frequency correction to assure production of accurate modulation frequencies by the frequency dividers associated with the oscillator at a time interval after 8 periods of sync reference frequency 4F and lasting for an interval equal to 40 periods of frequency 4F.

The flip-flop 117 together with counters 111, 113 and shift register 105 may be regarded to be a second time gating circuit which enables the servo channels after 32 counts of the counter 113 and lasting for 144 counts of the same counter. In FIG. 2, the first and second time gating circuits of FIG. 6 are represented by time gates 40.

These time gating circuits, together with signal processing provided in each servo channel, provide an enhanced signal to noise ratio for the sectorized data path following servo system of the present invention.

We claim:

1. In a data-path following servo system wherein fine lateral transducer position control is obtained by balancing two positional signals derived by combining two modulation frequencies with two different, recorded servo frequencies, the improvement comprising, a data recording medium having a plurality of parallel servo tracks contained in spaced apart sectors interrupting user data path recording areas, said sectors having successive parallel servo tracks whereby a longitudinal boundary between two adjacent servo tracks projected outwardly from a sector defines the center line of a user data path, each of said servo tracks having header and tail regions, one following the other, in each sector, one of said sector regions having sync reference waveforms of a single selected frequency recorded therein in both of said adjacent servo tracks for deriving a sync reference input signal for a phase-locked oscillator means and a second adjacent sector region having recorded servo waveforms of two different servo frequencies in said adjacent tracks recorded therein for deriving two positional signals, and a phase-locked oscillator means connected to receive said signals representing said sync reference waveforms for generating a pair of modulation signals, each having a different modulation frequency whereby said pair of modulations signals are mixed with said two recorded servo frequencies obtaining two positional signals for balancing to correct lateral transducer position.

2. The apparatus of claim 1 wherein said data recording medium is a disk having a center of rotation and said recorded servo tracks have longitudinal boundaries in said sectors, said boundaries being arcs of circles centered at said center of rotation.

3. The apparatus of claim 2 wherein longitudinal boundaries of said sectors all subtend an equal angle with respect to said center of rotation.

4. The apparatus of claim 1 wherein adjacent spaced apart sectors which interrupt user data path recording areas are spaced apart by equal distances.

5. The apparatus of claim 1 wherein said sync reference waveforms precede said recorded servo waveforms.

6. The apparatus of claim 1 wherein said recorded servo waveforms have closely spaced but different frequencies.

7. The apparatus of claim 1 wherein said phase-locked oscillator means comprises a voltage-controlled oscillator having a frequency divided output connected to a phase detector in a phase-locked loop, said phase detector having circuit means for sensing whether the divided output of the voltage-controlled oscillator leads or lags the sync reference signal and for correcting the frequency of the voltage controlled oscillator in response to a signal from said circuit means.

8. The apparatus of claim 1 wherein said phase-locked oscillator means is productive of an oscillator signal having a frequency which is an integer multiple of said modulation frequencies, said oscillator means having frequency dividers connected thereto for dividing the frequency of said oscillator means into said modulation frequencies, thereby producing modulation frequencies.

9. The apparatus of claim 8 wherein said oscillator signal has a frequency which is an integer multiple of a data write-clocking frequency, said oscillator means having another frequency divider connected thereto for dividing the frequency of said oscillator means into said data write-clocking frequency.

10. The apparatus of claim 1 wherein said phase-locked oscillator means is connected to a time gating means for enabling said phase-locked oscillator means a specified time after first receipt of said signals representing said sync reference waveforms.

11. In a servo system for following a data path, said system deriving positional data path error correcting signals from two adjacent servo tracks recorded in a data recording medium, each containing a different frequency waveform to be modulated with a pair of modulation frequencies from a phase-locked oscillator having a synchronizing reference input, the improvement in data path alignment comprising, a plurality of parallel, recorded servo tracks contained in spaced apart sectors interrupting user data path recording areas, said sectors having laterally adjacent servo tracks whereby a longitudinal boundary between two of said adjacent servo tracks projected outwardly from a sector defines the centerline of a data path, each of said servo sectors having two regions, one sector region having sync reference waveforms of a single selected frequency recorded in said adjacent servo tracks for deriving a synchronizing reference input signal for said phase-locked oscillator and a second adjacent sector region having two servo waveforms of different servo frequencies recorded in said servo tracks whereby two modulation frequencies from an oscillator may be mixed with said two servo frequencies thereby generating positional data path error correcting signals.

12. The apparatus of claim 11 wherein said servo tracks have longitudinal boundaries which are circular arcs having a common center at a center of rotation, said boundaries all subtending an equal angle with respect to said center of rotation.

13. The apparatus of claim 11 wherein sync reference waveforms in said one region precede recorded servo waveforms in said second region.

14. The apparatus of claim 11 wherein said servo waveforms have closely spaced but different frequencies.

15. In a disk recording system having an area for recording data on a recording medium and a transducing head to read and write said data, a servo system for maintaining data path following accuracy of a transducing head upon rotation of the data path, the combination comprising, a plurality of parallel servo tracks contained in circumferentially spaced apart, radially aligned sectors interrupting user data path recording areas, said sectors having laterally adjacent servo tracks whereby a longitudinal boundary between two of said adjacent servo tracks projected outwardly from a sector defines the centerline of a data path, each adjacent pair of said servo tracks having two sector regions, one sector region having two adjacent sync reference waveforms of a single selected frequency recorded in said servo tracks for deriving a synchronizing reference input signal for said phase-locked oscillator and a second adjacent sector region having two servo waveforms of different frequencies recorded in said servo tracks for deriving first and second servo frequencies whereby two modulation frequencies from an oscillator may be mixed with said two servo frequencies thereby generating positional data path error correcting signals, a transducer means movably mounted with respect to a data path for converting said sync reference and recorded servo waveforms into sync and servo signals, phase-locked oscillator means connected to said transducer means and having as an input a sync signal derived from said sync references waveforms and generating in response thereto first and second modulation frequencies similar in frequency to first and second servo frequencies, first and second servo channel means electrically connected to said phase-locked oscillator means for respectively mixing in said first channel said first modulation frequency with said first and second servo frequencies and modulating in said second channel said second modulation frequency with said first and second servo frequencies, said first and second servo channel means having filter means for passing in said first channel a first positional information signal equal to the difference between said first modulation frequency and second servo frequency and for filtering in said second channel a second positional information signal equal to the difference between said second modulation frequency and first servo frequency, and actuator means connected to receive said first and second positional information signals further processed into a positional error signal for laterally moving said transducer means with respect to said data track in response to the balance of said positional information signals.

16. The apparatus of claim 15 wherein adjacent spaced apart sectors which interrupt user data path recording areas are spaced apart by equal distances.

17. The apparatus of claim 15 wherein said sync reference waveforms precede said servo waveforms.

18. The apparatus of claim 15 wherein said servo waveforms have closely spaced but different frequencies.

19. The apparatus of claim 15 wherein said phase-locked oscillator means comprises a voltage-controlled oscillator having a frequency divided output connected to a phase detector in a phase-locked loop, said phase detector having circuit means for sensing whether the divided output of the voltage-controlled oscillator leads or lags the sync reference signal and for correcting the frequency of the voltage-controlled oscillator in response to a signal from said circuit means.

20. The apparatus of claim 15 wherein said phase-locked oscillator means is productive of an oscillator signal having a frequency which is an integer multiple of said modulation frequencies, said oscillator means having frequency dividers connected thereto for dividing the frequency of said oscillator means into said modulation frequencies, thereby producing modulation frequencies.

21. The apparatus of claim 15 wherein said phase-locked oscillator means is connected to a time gating means for enabling said phase-locked oscillator means a specified time after first receipt of said signals representing said sync reference waveforms.

22. The apparatus of claim 20 wherein said oscillator signal has a frequency which is an integer multiple of a data write-clocking frequency, said oscillator means having another frequency divider connected thereto for dividing the frequency of said oscillator means into said data write-clocking feature.

* * * * *